United States Patent [19]

Weisend, Jr. et al.

[11] Patent Number: 5,035,380
[45] Date of Patent: Jul. 30, 1991

[54] DE-ICER

[75] Inventors: Norbert A. Weisend, Jr., Cuyahoga Falls; Paul G. Tritt, Norton, both of Ohio

[73] Assignee: The B. F. Goodrich Company, Akron, Ohio

[21] Appl. No.: 462,207

[22] Filed: Jan. 9, 1990

[51] Int. Cl.$^5$ ............................................. B64D 15/00
[52] U.S. Cl. ............................ 244/134 A; 244/134 R; 137/613; 137/505.41
[58] Field of Search ........................ 244/134 R, 134 A; 137/505.41, 613

[56] References Cited

U.S. PATENT DOCUMENTS

| 2,489,799 | 11/1949 | Minshall | 244/134 A |
| 3,276,470 | 10/1966 | Griffing | 137/505.41 |
| 3,693,916 | 9/1972 | Tritt et al. | 244/134 A |
| 4,733,834 | 3/1988 | Phillips, II | 244/134 R |
| 4,735,554 | 4/1988 | Phillips, II | 244/134 A |

Primary Examiner—Joseph F. Peters, Jr.
Assistant Examiner—Christopher P. Ellis
Attorney, Agent, or Firm—Joseph Januszkiewicz

[57] ABSTRACT

A deicer control system for a pneumatic deicer wherein a solenoid operated valve directs either pressurized air or creates and pulls a vacuum on the inlet port of a control valve. The inlet port communicates to an outlet port in the control valve post moveable piston which in one position maintains communication between the ports and in a second position is operative to block communication between the ports. The piston has one face of the piston with two distinct effective surface areas, wherein one surface area communicates at all times with the inlet port and upon a predetermined force on such one surface area such piston is moved to expose both effective surface areas and block communication between the inlet port and the outlet ports of the control valve.

9 Claims, 4 Drawing Sheets

DE-ICER

BACKGROUND OF THE INVENTION

This invention relates to a deicer control system for deicing the leading edge of an airfoil and more particularly to a control system with a pneumatically operated deicing device utilizing low pressure unregulated air.

Under certain atmospheric conditions, ice will form and accumulate on the leading edge of an aircraft wing, struts, stabilizers and propellers. In the discussion hereinafter reference to these parts will be made as airfoil and the description will be directed to the wing of an airplane, it being understood that such description is equally applicable to the aircraft struts, stabilizers or propellers. Such accumulation of ice is undesirable as it adds weight to the aircraft as well as alters the aerodynamics configurations of the airfoil to change materially the efficiency thereof.

To break up the ice formation on the wings of an aircraft, pneumatic deicing equipment, pads, boots or means are employed utilizing a series of resilient inflatable tubes covering the leading edge area of the wings to deice them. An air supply system is used to alternately inflate and deflate the tubes to flex the deicer pad. Such repetitive flexing action shatters or breaks up the ice formation or layers as they form on the leading edge of the deicer pad and are broken into particles, which ice particles are blown off by the airstream moving over the airfoil.

Since icing conditions exist only for a relatively small portion of the total aircraft flight time it is necessary during non-deicing use to maintain a vacuum on the tubes to assure a smooth exterior surface on the deicing pad. Irregularities on the deicer pad would seriously reduce aircraft performance and efficiency by creating unwanted air turbulence. To effect a positive pressure into the tubes of the deicer pad, a solenoid operated valve upon actuation is operative to direct pressurized air thereto in cooperation with a pressure regulator which is used to reduce the supply air pressure to the deicer system. Under normal conditions the air supply for the deicer is the bleeding off of a very small portion of the pressurized air from the compressor section of the aircraft's turbine engine. Under certain operating conditions. the bleed off pressure can drop to a pressure equal to or slightly less than the deicer system value. As the supply pressure drops to pressures lower than the needed pressure, the pressure regulator becomes restricted and the deicer inflation flow of air is reduced substantially and impares the proper functioning of the deicer pad. The present invention is directed to the elimination of the need for a pressure regulator and thus in effect uses unregulated air to insure the proper functioning of the deicer by utilizing the available source of air pressure to inflate the pneumatic deicer rapidly, especially when the source pressure is near deicer operating pressure. Such deicing device of the present invention overcomes the limitation of present pneumatic deicer systems operating components that result in deicer inflation that is too slow for effective performance when the air supply pressure is low in the engine turbine bleed system.

SUMMARY OF THE INVENTION

A deicer control system for controlling the inflation and deflation of inflatable tubes of a deicer wherein a solenoid operated valve is selectively operated to direct pressurized air or pull a vacuum on an outlet that communicates with the inlet port of a control valve. Such control valve has its output port spaced from the inlet port and is connected to the inflatable tubes. The control valve has a spring biased piston with two effective surface areas, with one of such areas being connected at all times to the pressure or vacuum at the inlet port and is effective at a predetermined pressure to expose the two effective surface areas to the full pressure from the inlet ports and move the piston to block the flow of fluids between the inlet ports and outlet port of the control valve and thus lock the pressurized air within the inflatable tubes.

DETAILED DESCRIPTION

Figure 1:
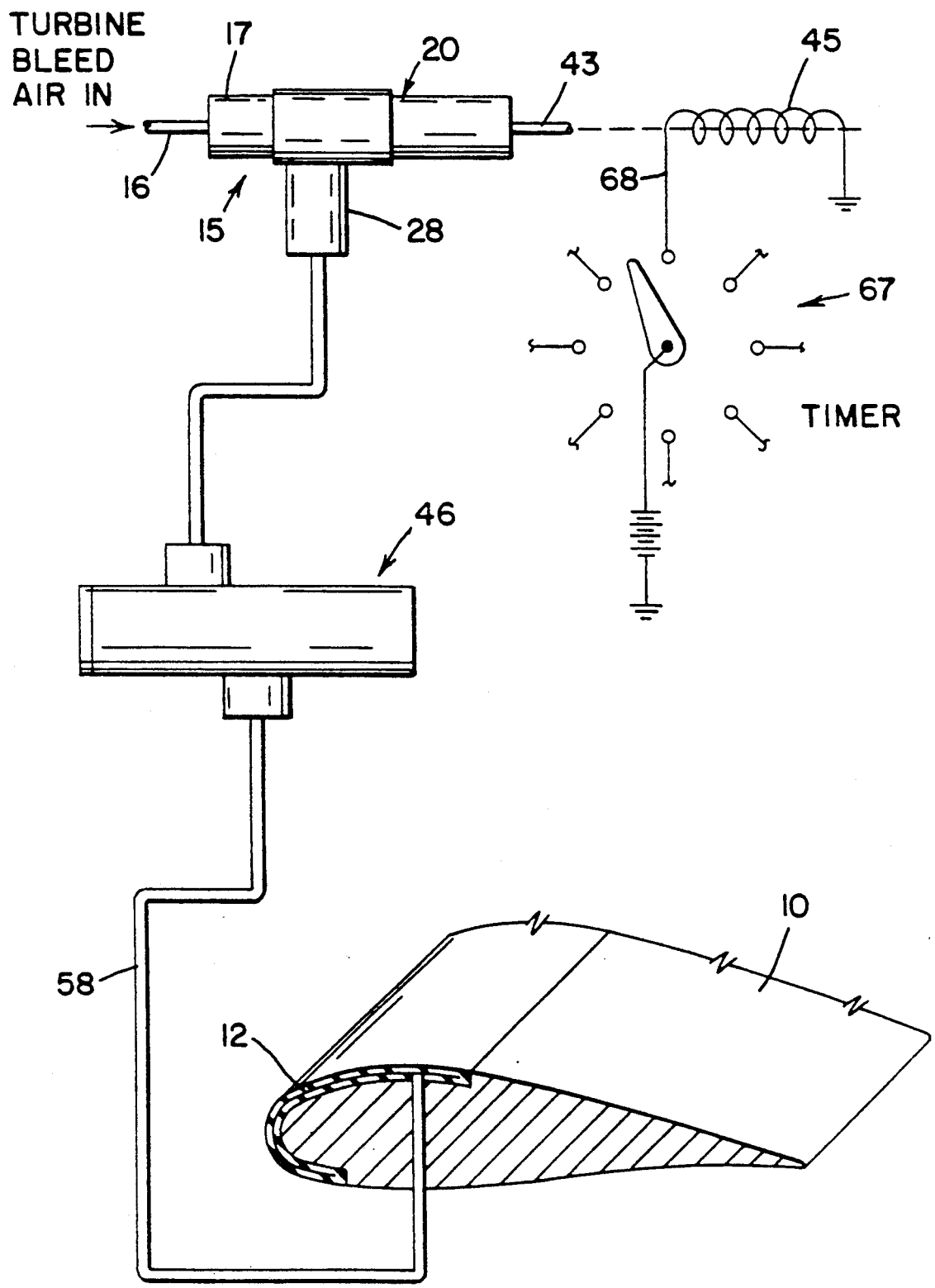
FIG. 1 is a diagrammatic view of a portion of an airplane's wing with a deicer pad and the control circuit for the inflation and deflation of the deicer pad.

Referring to the drawings wherein like reference numerals designate like or corresponding parts throughout the several views, there is shown in FIG. 1 a portion of an airplane wing 10 having a leading edge upon which is mounted a deicer pad 12, only a portion of which is shown. Such deicer pad 12 has a plurality of inflatable tubes or passageways covered by an extensible, flexible and elastic structure of rubber or rubber like material reinforced with fabric. The distension of such tubes or passageways break up the ice accumulated on the deicer pad in a manner old and well known in the art.

A solenoid operated control valve 15 to be described has a conduit 16 connected to its inlet port or bore 17 which delivers pressurized air as from a bleed off from a turbine engine that is suitably attached to the fuselage of the airplane. Such bleed off is a small portion of the pressurized air from the turbine's engine.

Figure 2:
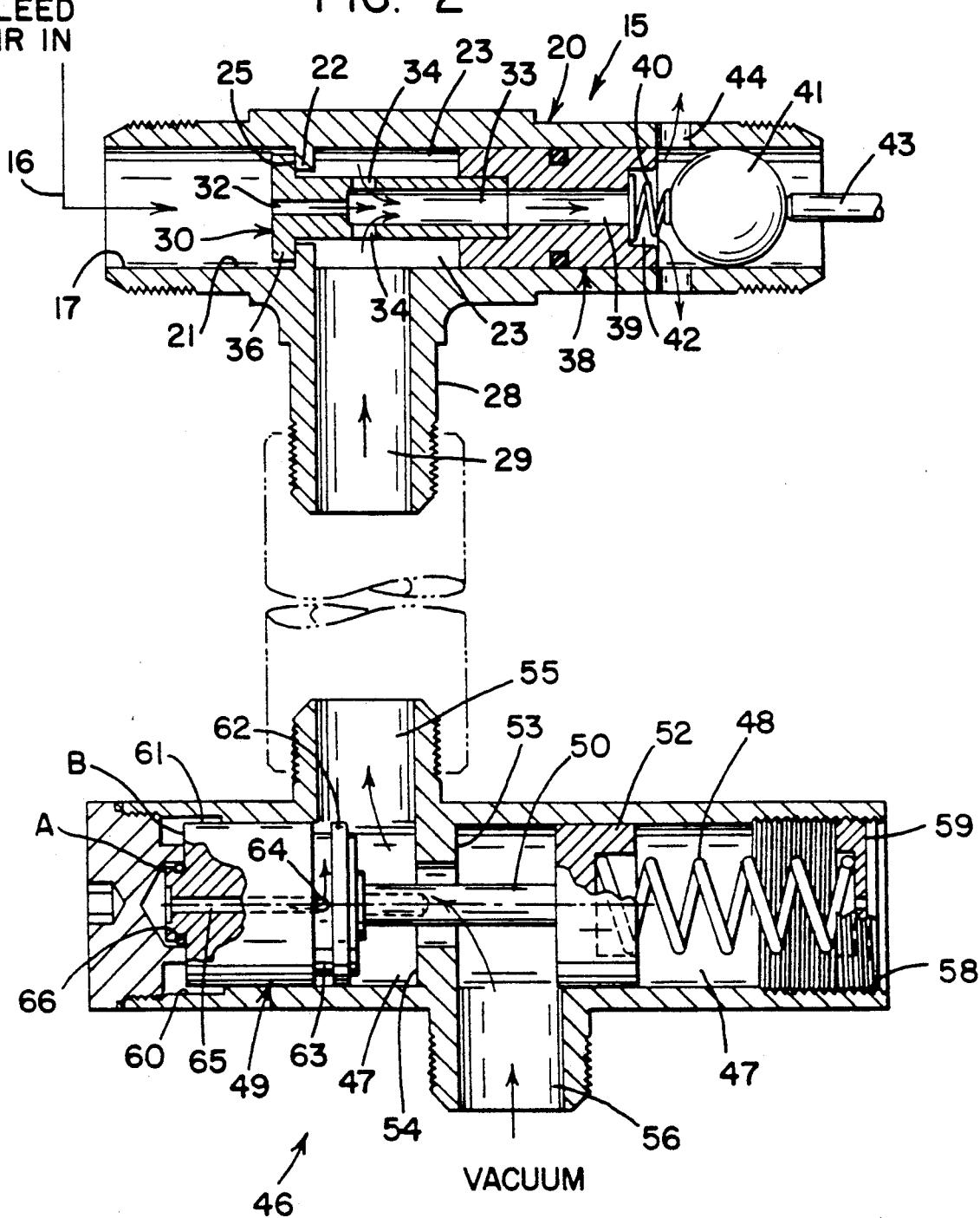
FIG. 2 is a cross sectional view of a pressure limiter and an air valve in a condition of pulling a vacuum on the deicer pad.
Figure 3:
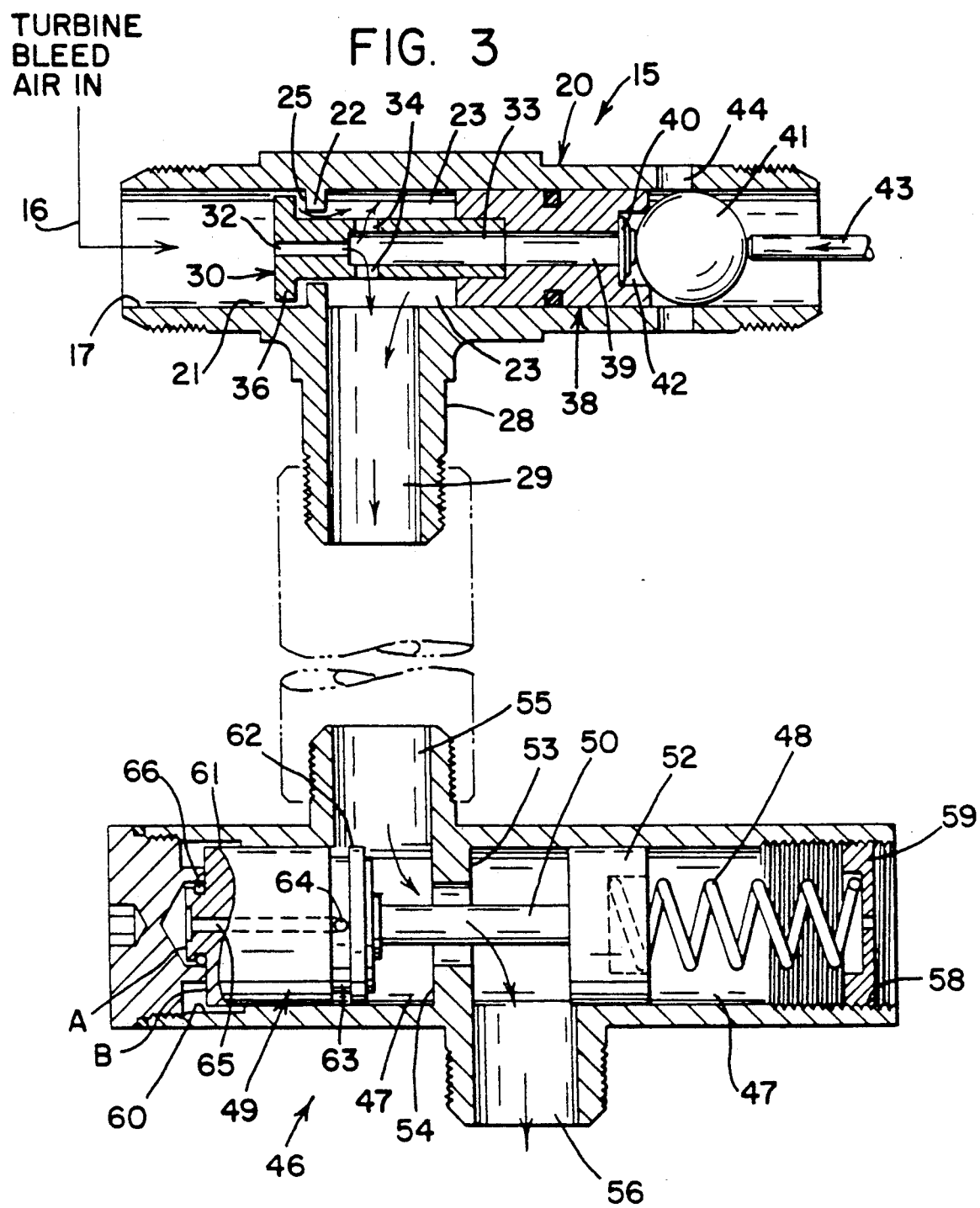
FIG. 3 is a cross sectional view of the pressure limiter and control valve in a condition for inflating the deicer pads.

As seen in FIG. 2 and 3, the control valve 15 has an elongated cylindrical housing 20 with a central bore 21 and an annular member, ring or seat 22 fixedly mounted therein. Cylindrical housing 20 has a tubular portion 28 extending at right angles therefrom with a central bore or outlet port 29 therein. Slidably mounted in one end of the central passageway 21 is spool valve 30, which spool valve 30 has a passageway or orifice 32 communicating with a larger passagewaY or second bore 33. Annular member 22 forms an annular chamber 23 in cooperation with the interior bore 21 of housing 20 and the exterior surface of spool valve 30. A flange 36 is located on the one end of spool valve 30, which in its normal condition of operation seats against an annular shoulder 25 of annular member 22 to thereby direct the flow of air from conduit 16 to the central bore 21 and thence into passageway 32. Spool valve 30 has a plurality of circumferentially spaced bores 34 located downstream from the passageway 32 to communicate the pressurized air flowing through passageway 32 and through the passageway 33 to create and pull a vacuum thereon, which vacuum or suction is pulled into annular chamber 23 and bore 29 as depicted by FIG. 2.

An annular sleeve 38 is suitably secured to the other end of spool valve 30 (to be integral therewith) and has a central bore 39 substantially the same diameter as the passageway 33 in spool valve 30 which is adjacent thereto. The other end of annular sleeve 38 is recessed to provide a seat for a spring 40 which biases a ball valve 41 away from a port 42, which port 42 is formed by central bore 39 at the other end of sleeve 38. Ball valve 41 is in contact with a rod 43. In the position shown in FIG. 2, ball valve 41 is unseated from port 42, but upon energization of a coil 45, rod 43 will move ball valve 41 into the position shown in FIG. 3 wherein port 42 is closed and the turbine bleed air via conduit 16 will pass through the clearance space between the inner surface of passageway 21 of housing 20 and the exterior surface of flange 36 located at the one end of spool 30, thence between the clearance space between annular member 22 and the flange 36 for passage into annular chamber 23 and thence via bore 29 to a valve 46.

Figure 4:
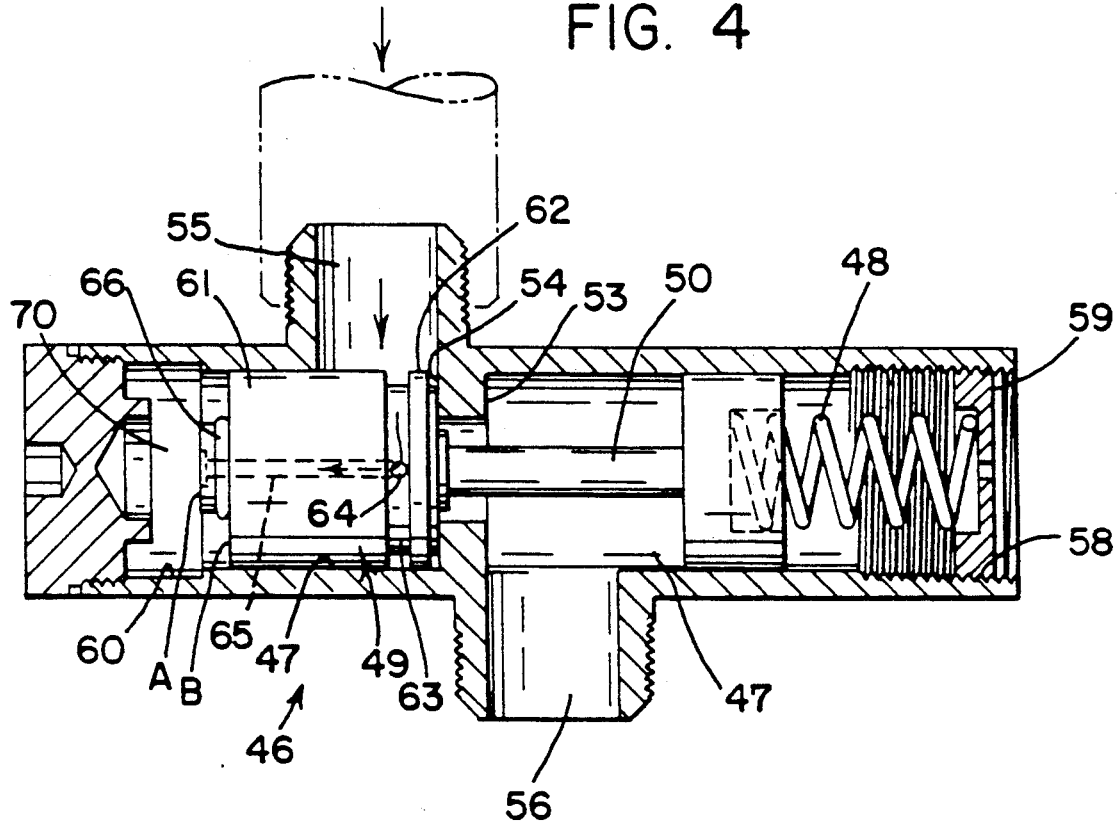
FIG. 4 is a cross sectional view of the pressure limiter in a no-flow condition after inflation of the deicer pad.

Valve 46 is a generally cylindrical housing with a longitudinal extending central bore 47 which is suitably capped at both ends. One end houses a spring 48 while the other end receives a piston 49. Piston 49 has a piston rod 50 connected to it, which rod 50 then has a second piston 52 connected to its other end. Such pistons 49 and 52 are closely received by the central bore 47. Spring 48 is seated on piston 52 and biases piston 52 and 49 to left as seen in FIG. 2, 3, and 4. Piston 49 has two spaced surface areas of operation, wherein one end is stepped to present a circular sized area face designated A (in FIGS. 2 and 3) and an annular area face designated B, which area B is larger in surface area than sized area face A.

The housing of valve 46 has an annular flange 53 in its central bore 47 presenting an annular shoulder 54. As seen in FIG. 2, 3 and 4, valve 46 has an inlet port 55 that communicates the central bore 47 with the bore 29 of control valve 15. Valve 46 has an outlet port 56 that communicates the central bore 47 with a conduit 58 (FIG. 1), which in turn communicates with the tubes in the deicer 12 for inflation thereof and for also pulling a vacuum thereon as to be described. Inlet port 55 is located on one side of the annular shoulder 54 in central bore 47, while outlet port 56 is located on the other side of annular shoulder 54. The one end of the central bore 47 is threaded (as at 58) to receive a threaded plug 59 which is used to adjust the compression of spring 48. Such plug 59 has an aperture to vent the area between the piston 52 and such plug 59 to prevent a build up of a vacuum to permit the unrestricted movement of piston 52. The other end of central bore 47 is slightly larger in diameter as at 60 to slidably receive the one end portion 61 of piston 49. The other end portion 62 of piston 49 is slidably received by central bore 47 and is operative to engage annular shoulder 54 as seen in FIG. 4. Piston 49 adjacent to other end portion 62 has an annular groove 63, which groove 63 has a vent hole or orifice 64 that communicates with the inlet port 55 (FIG. 2) and also with a passageway 65 in piston 49 that terminates into the circular sized area face A. The stepped portion between the circular sized area face A and the annular area face B receives an annular seal 66. When sufficient pressure builds up in this small piston area A, it overcomes the bias of spring 48 and then exposes the total area of the circular sized areas A and B, which allows the rapid build-up of pressure to rapidly overcome the bias of spring 48. Movement of piston 49 then allows the end portion 62 to seal off the flow of pressurized air from inlet 55 to outlet port 56 by seating against annular shoulder or seat 54.

To control the energization and de-energization of the coil 45 and the corresponding movement of rod 43, a suitable timer 67 upon actuation by an operator, will make contact at the pre-set time interval in a manner old and well known in the art with electric line 68 which will energize coil 45. A diagrammatic showing of a timer for multiple deicers is shown in FIG. 1. Such figure depicts a central timing mechanism that has plural taps that control several coils that can be operated in timed relation whereas only one deicer unit was described. The length or interval can be controlled as desired in a manner old and well known in the art.

Assuming that the control circuit is off, a low volume of unregulated pressurized air is bled off from the turbine engine via conduit 16 to control valve 15, which pressurized air flows through central bore 21 and out via exhaust ports 44 which are in the cylindrical housing 20 between the annular sleeve 38 and the ball valve 41. During the flow of such pressurized air a suction is created and a vacuum pulled within the bores 34, which action also pulls a vacuum in bore 29 which in turn pulls a vacuum through valve 46 on the tubes in the deicer pad 12. Valve 46 is in the position shown in FIG. 2 wherein the inlet port 55 communicates directly with outlet port 56. Thus the deicer pad will be maintained in a deflated condition providing for the smooth flow of air over the wing 10 of the aircraft. Upon actuation of the timer by an operator to place the deicer controls into operation, the timer switch will upon the preset time, send an electrical current via line 68 to energize coil 45, which then pushes the plunger or rod 43 leftward as seen in FIG. 2 to the position shown in FIG. 3 which seats ball valve 41 against port 42, compressing spring 40 and moving sleeve 38 and spool valve 30 leftward as viewed in FIG. 3 to thereby interrupt the flow of pressurized air thorough the central bore and out the exhaust ports 44 to thereby interrupt the vacuum pull on the inflatable tubes in deicer pad 12 and direct the flow of pressurized air from conduit 16 to the inlet port 17 and around the annular flange 36 and thence via bores 34 into annular chamber 23, which in turn flows via bore 29 to the inlet port 55, past pistons 49 and 52 to the outlet port 56 and via conduit 58 for pressurization of the inflatable tubes in the deicer 12.

As the pressurized air flows past piston 49, a portion of the pressurized air flows via vent hole 64 into passageway 65 to the circular sized area face A bounded by the small area of the piston head as defined by the annular seal 66 and thence unbalances the spring 48 to move slightly rightward as seen in FIG. 4 to expose the entire face (A and B) of the one end portion 61 of piston 49 which then allows a rapid build up of pressure to overcome the force of spring 48 to move the pistons 52 and 49 rightward as viewed in FIG. 4 to seat end portion 62 of piston 49 against the annular shoulder or seat 54. This action locks the pressurized air in the inflatable tubes of the deicer until the timer breaks the flow of current to line 68 and deenergizes coil 45 which moves rod 43 to unseat ball valve 41 and again creates and pulls a vacuum from chamber 23 which in turn is connected via bore 29 and valve 46 to the deicer pad. The vacuum drawn in bores 34 and chamber 23 also draws a vacuum on inlet port 55 which in turn draws a vacuum through passageway 65 which then draws a vacuum in the chamber 70 (FIG. 4) defined by the enlarged head portion 61 and the end wall of central bore 47. When the pressure in such chamber 70 is depleted the pressurized air trapped in the valve 46 and the tubes of the deicer will move the piston head 49 leftwardly and thereby exhaust the pressurized air to collapse the tubes in the deicer 12.

Various modifications are contemplated and may be resorted to by those skilled in the art without departing from the described invention as hereinafter defind by the appended claims as only a preferred embodiment thereof has been disclosed.

We claim:

1. A deicer control system for controlling the inflation and deflation of inflatable units of a deicer comprising inflatable units operative on flexing to break up ice accumulated thereon, a solenoid operated valve having an inlet and two outlet bores, said solenoid operated valve operative to selectively direct pressurized air or pull a vacuum to one of said outlet bores, a pressure source of unregulated air pressure connected to said solenoid operated valve and operative to be the sole source of pressurized air to said-solenoid valve, a control valve having an inlet port and an outlet port, said inlet port connected to said one outlet bore of said solenoid operated valve, said outlet port connected to said inflatable units, said control valve having a central bore, a slidable piston mounted in said central bore, a spring mounted in Said central bore and in contact with said piston to bias said piston to maintain a fluid connection between said inlet port and said outlet port, said piston having a pair of oppositely disposed faces, one of said faces having a first sized area and a second sized area said piston having a vent port operatively interconnecting said inlet port to said first sized area to move said piston to expose said first and second sized areas in response to a pressure from said inlet port that is equal to or greater than said spring bias on said piston.

2. A deicer control system for controlling the inflation and deflation of inflatable units of a deicer as set forth in claim 1 wherein said spring in said central bore is an adjustable spring mounted on the other end of said control valve to normally bias said piston into a first position to interconnect and maintain said inlet port connected to said outlet port.

3. A deicer control system for controlling the inflation and deflation of inflatable units of a deicer as set forth in claim 2 wherein said first sized area of said piston is a circular sized area face and said second sized area is an annular sized area face wherein said circular area face communicates at all times with said inlet port.

4. A deicer control system for controlling the inflation and deflation of inflatable units of a deicer as set forth in claim 3 wherein said solenoid operated valve has a moveable spool that is operative in a first position to create and pull a vacuum on said one outlet bore, and said spool moveable to a second position to direct pressurized air to one said outlet bore.

5. A deicer control system for controlling the inflation and deflation of inflatable units of a deicer as set forth in claim 4 wherein said spool has the other one of said outlet bores communicating with atmosphere, and a solenoid operative upon actuation to move said spool to said second position while closing off said other one of said outlet bores.

6. A system for controlling the inflation and deflation of inflatable units of a deicer, comprising inflatable units that are operative on flexing to break up ice accumulated thereon, a solenoid operated valve with an inlet bore and a pair of outlet bores, a pressure source of unregulated air connected to said inlet bore, said solenoid operated valve having a central passageway with a slidable spool valve therein, said spool valve operative between a first position and a second position, a solenoid operated rod operative to move said spool valve between said first and said second position, said control valve having said passageway for receiving pressurized air from said pressure source when said spool valve is in said second position, said spool valve in said first position operative to direct pressurized air to one of said outlet bores, said spool valve operative in said second position to create a pull a vacuum in said one outlet bore, a pressure limiter valve having a central passageway with an inlet port and an outlet port, said one outlet bore of said solenoid valve connected to said inlet port, a piston mounted in said central passageway, a spring mounted in said central passageway operatively connected to said piston to bias said piston into an inoperative position to connect said inlet port to said outlet port, said outlet port communicating with said inflatable units of said deicer, said piston having a piston head whose one side has two pressure areas, said two areas being a first surface face and a second surface face, said first surface face being operatively connected at all times to said inlet port to be maintained at the same pressure or vacuum as on said inlet port, said piston being moveable to an operative position to block the connection between said inlet port and said outlet port, said piston movable into said operative position in response to a pressure build up on said first surface face from said inlet port that is equal to or greater than said spring bias on said piston which locks pressurized air in said inflatable units.

7. A system for controlling the inflation and deflation of inflatable units of a deicer as set forth in claim 6 wherein said pressure limiter valve has means for adjusting the spring bias of said spring on said piston to control the pressure needed to move and actuate said piston.

8. A system for controlling the inflation and deflation of inflatable units of a deicer as set forth in claim 7 wherein said central passageway has an annular shoulder defining a central orifice that interconnects said inlet port with said outlet port, said piston has another side with a surface area operative upon actuation to seat on said annular shoulder to interrupt the flow of fluids between said inlet and outlet ports.

9. A deicer control system for controlling inflatable units for deicers comprising inflatable units that are operative upon flexing to break ice accumulated thereon, a first control valve for inflating and deflating said inflatable units, said first control valve having an input port and an output port, said output port connected to said inflatable units, a second control valve operatively connected at a source of fluid pressure to receive pressurized fluid continually therefrom, said second control valve operative in a first position to create and pull a vacuum on said input port and operative in a second position to supply pressurized air to said input port, said second control valve being a solenoid operated valve operative upon actuation to move from said first position to said second position, said first control valve having a normally bias to connect said input port to said output port, said first control valve having a piston head area with a first and second effective area, said first control valve operative in said normally biased condition to connect said first effective area to the pressure or vacuum at said input port, and said first control valve operative to expose said first and said second effective areas to said pressure or vacuum at said input port when the pressure in said first effective area is greater than said normal bias in said first control valve.

* * * * *